No. 12,377. REISSUED AUG. 8, 1905.

W. R. SNYDER.

ROTARY PLEASURE TOWER.

APPLICATION FILED MAR. 9, 1905.

5 SHEETS—SHEET 1.

Witnesses

Edwin L. Yewell

K. A. Costello

Inventor

Wm. R. Snyder

By

Attorney

ANDREW B. GRAHAM CO., PHOTO-LITHOGRAPHERS, WASHINGTON, D. C.

No. 12,377. REISSUED AUG. 8, 1905.

W. R. SNYDER.

ROTARY PLEASURE TOWER.

APPLICATION FILED MAR. 9, 1905.

5 SHEETS—SHEET 2.

Witnesses

Edwin L. Yewell

K. A. Costello

Inventor

W. R. Snyder

By

Henry M. Pope

Attorney

ANDREW. B. GRAHAM CO., PHOTO-LITHOGRAPHERS, WASHINGTON, D. C.

No. 12,377. REISSUED AUG. 8, 1905.

W. R. SNYDER.

ROTARY PLEASURE TOWER.

APPLICATION FILED MAR. 9, 1905.

5 SHEETS—SHEET 3.

Inventor

Witnesses

Edwin L. Jewell

K. A. Costello

By

Attorney

ANDREW B. GRAHAM CO., PHOTO-LITHOGRAPHERS, WASHINGTON, D. C.

No. 12,377.

REISSUED AUG. 8, 1905.

W. R. SNYDER.

ROTARY PLEASURE TOWER.

APPLICATION FILED MAR. 9, 1905.

5 SHEETS—SHEET 4.

Witnesses

Edwin L. Jewell

K. A. Costello

Inventor

Wm. R. Snyder

By by Henry Wharton

Attorney

ANDREW B. GRAHAM CO., PHOTO-LITHOGRAPHERS, WASHINGTON, D. C.

No. 12,377. REISSUED AUG. 8, 1905.

W. R. SNYDER.

ROTARY PLEASURE TOWER.

APPLICATION FILED MAR. 9, 1905.

5 SHEETS—SHEET 5.

Witnesses

Edwin L. Yewell

K. A. Castello

Inventor

By

Attorney

ANDREW. B. GRAHAM CO., PHOTO-LITHOGRAPHERS, WASHINGTON, D. C.

UNITED STATES PATENT OFFICE.

WILLIAM R. SNYDER, OF KIMBERTON, PENNSYLVANIA, ASSIGNOR, BY MESNE ASSIGNMENTS, TO REVOLVING AIR SHIP TOWER COMPANY, OF CHICAGO, ILLINOIS, A CORPORATION OF ILLINOIS.

ROTARY PLEASURE-TOWER.

No. 12,377. Specification of Reissued Letters Patent. Reissued Aug. 8, 1905.

Original No. 750,717, dated January 26, 1904. Application for reissue filed March 9, 1905. Serial No. 249,328.

*To all whom it may concern:*

Be it known that I, WILLIAM R. SNYDER, a citizen of the United States, residing at Kimberton, in the county of Chester and State of Pennsylvania, have invented certain new and useful Improvements in Rotary Pleasure-Towers, of which the following is a full, clear, and exact description.

This invention relates to rotating pleasure-towers; and the invention consists in the novel construction and combination and arrangement of parts, as will be hereinafter described, and pointed out in the claims.

Reference is to be had to the accompanying drawings, forming a part of this specification, in which—

Figure 1:
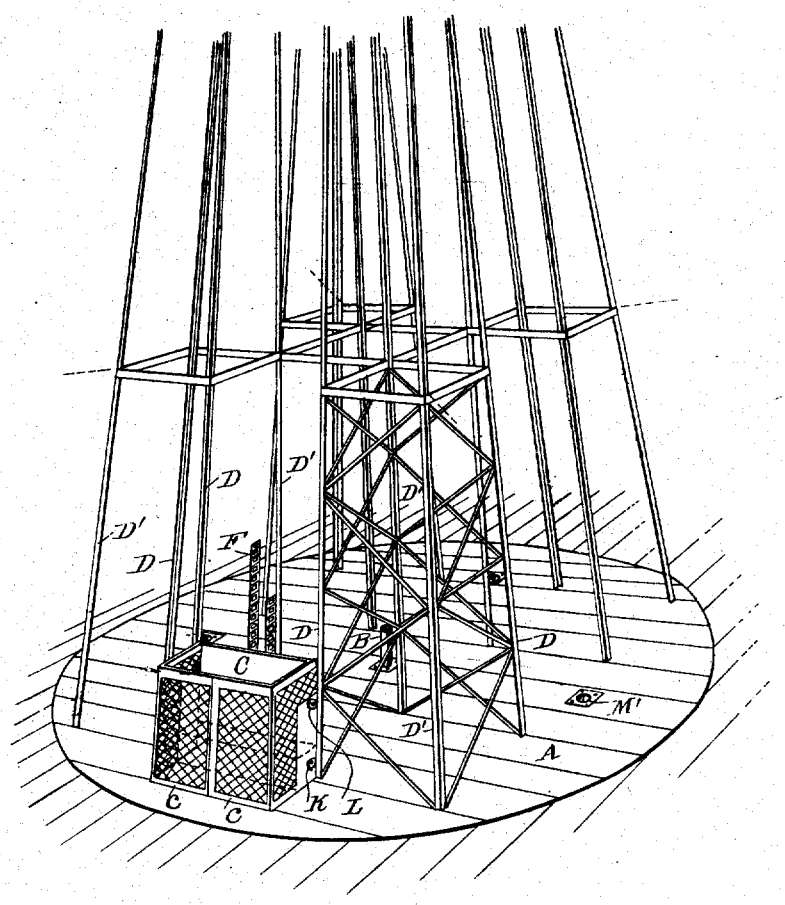
Figure 2:
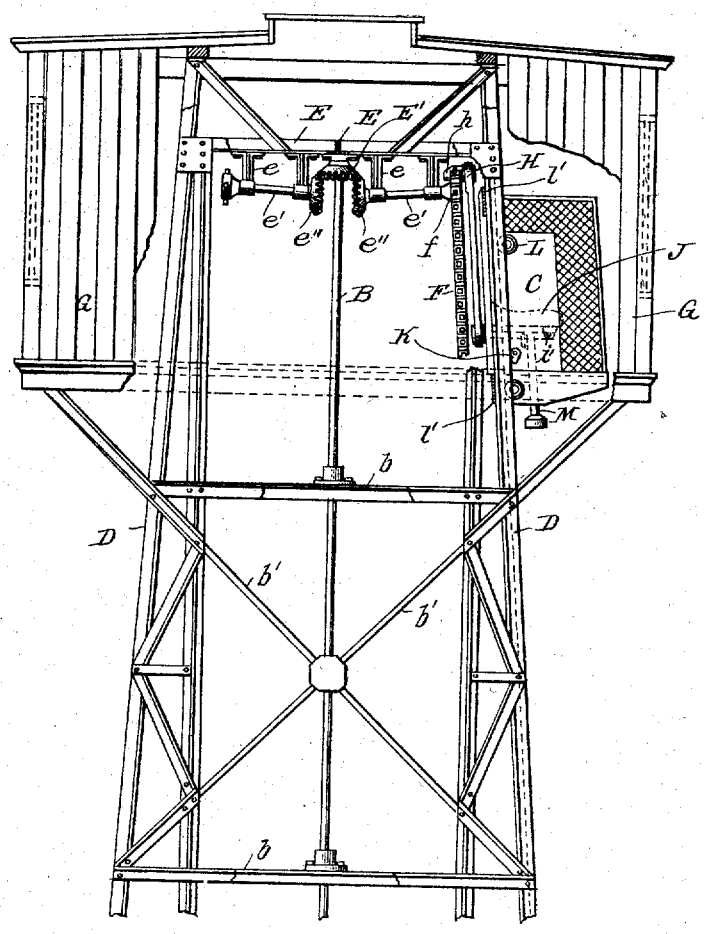
Figure 3A:
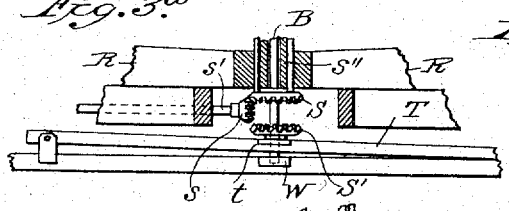
Figure 3B:
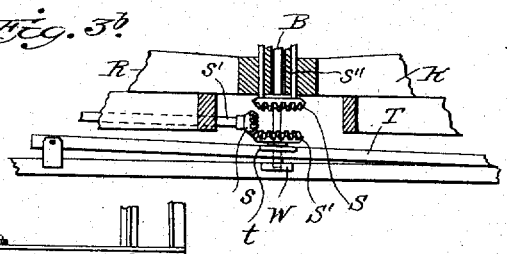
Figure 3:
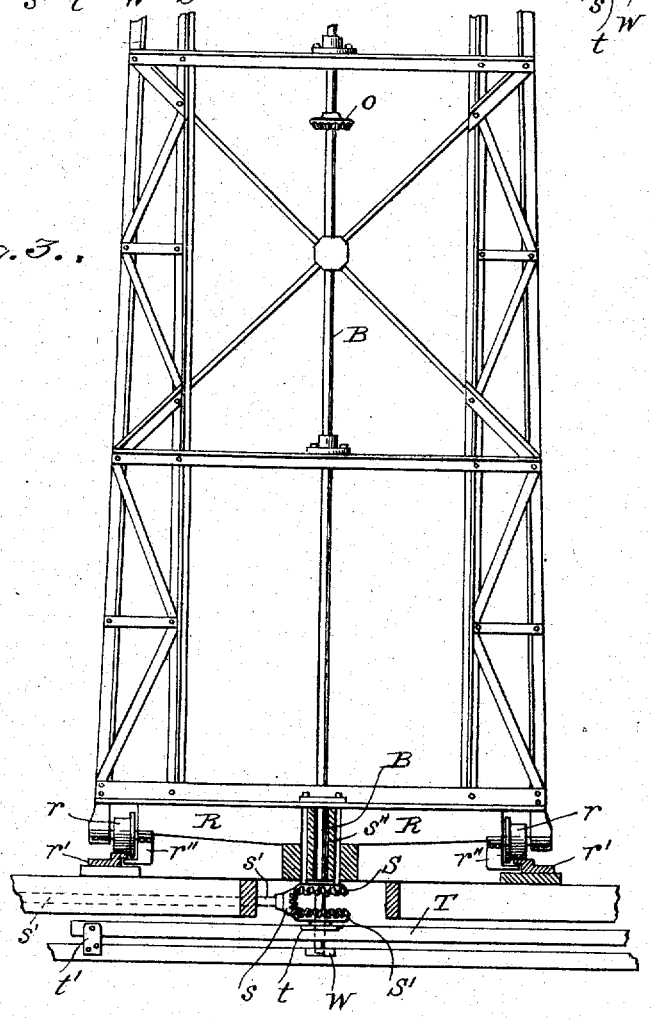
Figure 5:
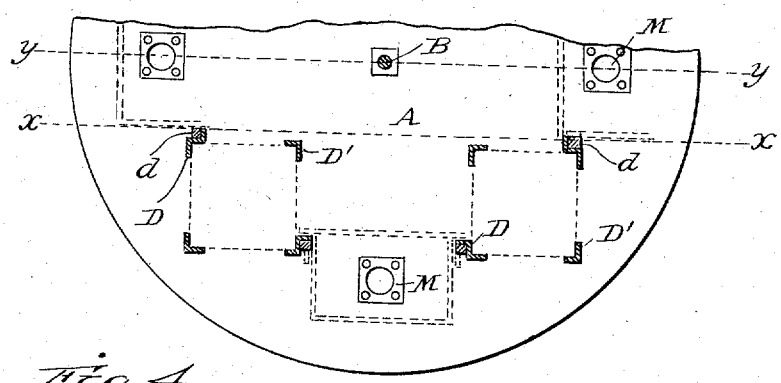
Figure 4:
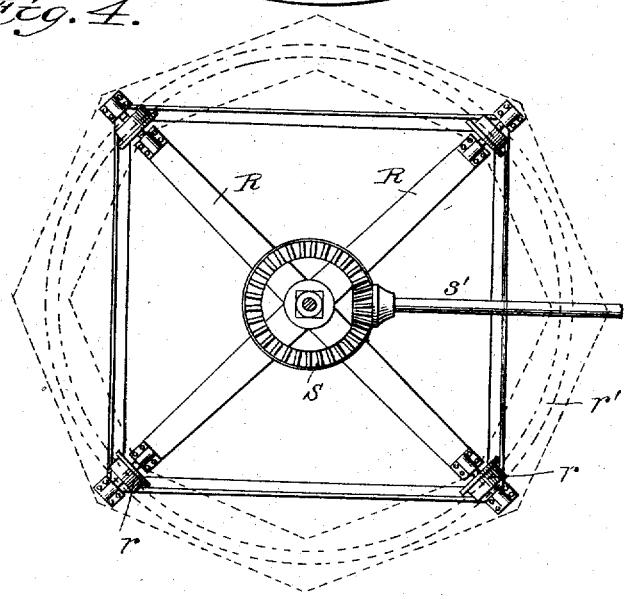
Figure 7:
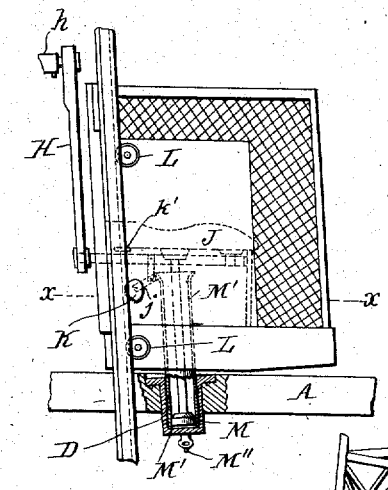
Figure 8:
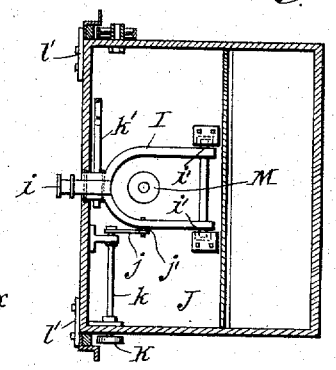
Figure 6:
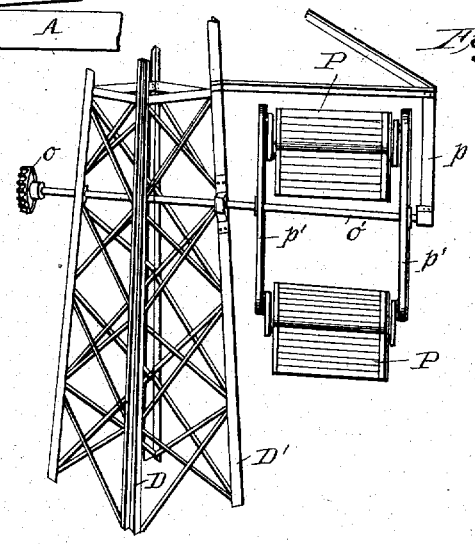
Figure 9:
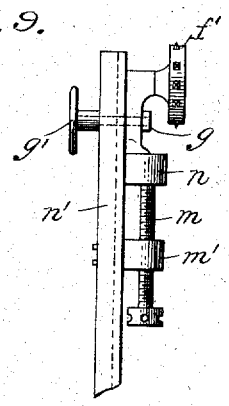
Figure 10:
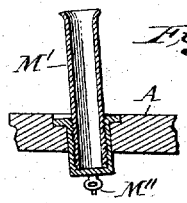

Figure 1 is a perspective view showing a curtailed general plan of the tower, indicating the locations of the upright posts, parallel guideways, central driving-shaft, pneumatic brakes, elevating-carriages, and in dotted lines the corners where the swings project. Fig. 2 is a side elevation taken on line *x x* of Fig. 5 with parts broken away, showing the top of the tower and one of the elevating-carriages on a level with the lookout-platform, also mechanism for carrying the carriages up and down the tower. Fig. 3 is a side elevation taken on line *y y* of Fig. 5 of the base of the tower with parts cut away to show the general arrangement of the operating-gear, track, and flanged wheels. Figs. $3^a$ and $3^b$ are detail views of the gearing hereinafter more fully described. Fig. 4 is an inverted plan view of the bottom of the rotating tower, showing the driving-gear, flanged wheels, and in dotted lines the track and supporting-timbers in relation thereto. Fig. 5 is a plan view of the base-floor of the tower, showing in section the upright posts of the tower and in dotted lines the locations of the elevating-carriages in relation thereto. Fig. 6 shows a detail section of one of the four corners of the rotating tower with a revolving swing and shaft attached thereto. Fig. 7 is a detail side elevation of one of the elevating-carriages at rest at the base of the rotating tower, showing in dotted lines the inclination and position of the pneumatic cylinder and plunger. Fig. 8 is an inverted plan view of the carriage through line *x x*, Fig. 7. Fig. 9 is a side elevation of a tension-regulator carrying the lower end of the sprocket-chain which raises and lowers the elevating-carriage. Fig. 10 is a sectional detail.

Similar letters of reference indicate corresponding parts, and the plural number is used when there is a plurality of parts not shown in the drawings being described.

In the drawings, A is the base-floor, upon which the tower rests, and B is a vertical driving-shaft which extends the entire height of the tower and is journaled at intervals throughout its entire length to cross-beams *b* or diagonal stay-rods *b'*.

C represents an elevating-carriage, one of which is to be located in each guideway between posts D D on each side of the tower, and *c c* are wire-protected doors to the carriages.

D and D' are the corner-posts of each of the corner-sections of the tower, D forming the parallel guideways for the carriages.

E represents cross-beams at the top of the tower, Fig. 2, the said beams E crossing each other at right angles. From these beams E hangers *e* are suspended, said hangers having journaled thereon shafts *e'*, carrying gear-wheels *e''*, and sprocket-wheels *f*.

E' is a central pinion keyed to driving-shaft B and meshing with gear-wheels *e''*.

F represents sprocket-chains which extend from the base to the summit of the tower and are driven by shafts *e'*. Only one of the chains is shown; but each carriage is equipped in like manner.

G is a sheltered lookout-platform at the top of the tower.

H is a connecting-arm located at the base of each elevator-chair and carrying at its top end a wrist-pin *h*, which is bolted to the sprocket-chain F, the said wrist-pin having a swivel movement in the end of said connecting arm H.

I is a yoke, Fig. 8, located under the seat J. Said yoke is pivotally journaled at its forked ends *i'* beneath the seat J, while its rear extremities embrace a shaft *i*, which has swivel-bearing in the lower end of connecting-arm H.

K' is a heavy spring which bears against the top of the yoke I.

*j* and *j'* are lever-bars pivotally joined to the yoke I and rigidly to shaft *k*, Fig. 8.

K is a grip-clutch which is connected to shaft *k*.

L represents track-rollers which bear against wooden tracks $l$, which tracks are bolted to the guide-posts D, the said rollers L being located at the sides of the carriages.

$l'$ represents stay-irons bolted to the back of each carriage and bearing loosely against the guide-posts D, the said stay-irons obviating any possibility of outward movement of the carriage, and thus preventing the track-rollers L from jumping off the track.

M is a plunger securely and rigidly bolted beneath the seat J. The said plunger M when at the bottom of the tower enters an air tube or cylinder M′, thus forming a pneumatic brake and providing for gradual landing at the base of the tower and also a safety-cushion in case of the remote possibility of the carriage falling to the bottom of the tower. The air-tube M′ is formed in two parts—a cast socket, which is securely bolted to the base of the tower, its upper threaded end being flush with the floor of the tower, and a tube screwing into said threaded end of the socket and rising above the floor, as shown in dotted lines in Fig. 7. This permits of the removal of the upper portion of the air-cylinder, if desired.

M″ is a petcock at the bottom of the air-cylinder M′ and is used to regulate the resistance of the air.

Suitably fastened to the framework of the tower at its base and in the rear of each carriage is a take-up or tension-regulator, Fig. 9, carrying a sprocket-wheel $f'$, said apparatus being used to regulate the tension of the sprocket-chains. As will be seen in Fig. 9, this tension-regulator consists of a sliding bar $n$, seated in a channel-iron $n'$, said bar $n$ carrying the sprocket-wheel $f'$. To the base of the sliding bar $n$ is socketed a screw $m$, said screw $m$ passing through a threaded block $m'$, removably bolted to the channel-iron $n'$.

$g$ is a grip-bolt which is provided with a grip-nut $g'$. When the tension of the sprocket-chain F is to be increased or diminished, the grip-nut $g$ is loosened and the screw $m$ is turned in the direction desired, and when this is accomplished the grip-nut is tightened. The grip-bolt serves to take the strain off of the screw $m$ and holds the sliding bar $n$ rigidly to the channel-iron $n'$.

O is a pinion located in line with the swing-shaft $o'$. This pinion drives the gear-wheels $o$, which are keyed to swing-shafts $o'$, one of the said shafts and gear-wheels being shown in Fig 6. Four swing-shafts $o'$ are employed, each shaft extending obliquely from the center of the diameter of the tower to and past the corner-posts D′ to a bearing in a hanging support $p$.

P represents revolving swing-seats, which are pivotally swung to arms $p'$, said arms being fastened to the shafts $o'$. The exact form of frame for suspending the swing-seats is not here shown. Any desirable construction may be used, and the number of revolving swings on the same shaft may be increased as desired.

R represents supporting-beams beneath the tower. Journaled to these beams are track flanged wheels $r$.

$r'$ is a circular track (shown in section in Fig. 3 and in dotted lines in Fig. 4) upon which the track-wheels $r$ run.

$r''$ represents keepers or flanges which are securely bolted to the supporting-beams R. These keepers are situated directly back of the track-wheels and extend downward and then at right angles beneath the wheels and flanges of the track, thus forming a safeguard against the wheels leaving the track.

S is a gear-wheel which is rigidly bolted to the beams of the tower truck or base, and S′ is a gear-wheel mounted upon the shaft B. The gear-wheel S′ has a limited movement up and down the shaft, but cannot revolve upon it. This is for the purpose of shifting in and out of gear.

$s$ is a pinion keyed to shaft $s'$. This shaft $s'$ transmits the power which revolves the tower, said pinion $s$ meshing with gear-wheel S.

Shaft $s'$ may be so arranged as to be thrown out of gear with gear-wheel S and in gear only with gear-wheel S′, thus permitting the tower to remain at rest while the shaft B is operating the carriages and swings.

T is a lever hinged at $t'$. The gear-wheel S′ is supported in the bearing $t$.

W is a foot-bearing upon which the lower end of the shaft B revolves.

$s''$ is a sleeve through which shaft B passes, thus forming a long bearing for the lower end of said shaft, stiffening it at that point, reducing the vibration upon the gear-wheels, and aiding the shaft B to act as an effective pivotal point around which the tower revolves upon its circular track.

In operation the rotating movement of the tower is imparted by shaft $s'$ and pinion $s$ to gear-wheel S. The rotation of shaft B is also effected through pinion $s$ when in gear with gear-wheel S′. Shaft B rotates in the opposite direction to the rotation of the tower; but said shaft B may remain at a standstill while the tower continues to rotate. This is effected by slightly lowering the lever T, thus throwing gear-wheel S′ out of gear with the pinion $s$. When shaft B rotates, pinion O, which is meshed with gears $o$, revolves the swing-shafts $o'$, of which there are four, revolving the four sets of swings P. The said shaft B also revolves the pinion E′, meshing with gear-wheels $e''$, thus revolving shaft $e$ and sprocket-wheel $f$. The shaft $s'$ can be lowered to move the pinion $s$ out of gear with the gear-wheel S, fixed to the tower, so that the latter comes to a standstill, while the pinion $s$ is still in engagement with the gear-wheel S′, (likewise lowered by lever T,) so that the carriages travel up and down and the swings keep going while the tower is at a standstill, as before described. The sprocket-chain travels up and down the tower, carrying the carriage with it by means of the connecting-arm H and wrist-pin *h*. To insure the safety of the carriages no matter at what position on the tower they may be located in case the sprocket-chain should break, the spring *k'* instantly forces down the yoke I, which has also a tendency to lower by its own gravitation, and throws the grip-clutch K firmly into the wooden track through the medium of the crank-levers *j* and *j''* and *k*. In case the grip-clutches K should prove ineffective the plunger M beneath the seat J when the carriage reaches the bottom will enter the air-cylinder M', thus providing an air-cushion which would lessen the shock. Other well-known safety devices may be added as occasion may demand.

It will be understood from the above description that while the tower is rotating the carriages moving up and down the inclined parallel guideways will travel a vertical spiral course, permitting the passengers to view the surroundings while in transit, and the revolving swings will travel a horizontal spiral course. The lookout house or platform at the top of the tower upon which the passengers land from the elevating-carriages rotates with the tower, permitting the passengers to view the surroundings without changing their positions.

There are to be four elevating-carriages—one at each of the four sides of the tower—and while two of the carriages are ascending two will be descending. The carriages may hold two or more persons.

The tower may be built to any height required and which the strength of materials may permit, and the exact construction of the tower-trusses may be varied without departure from the spirit of the invention. For instance, three upright posts at each of the four corners may be used if found strong enough for the height of the tower which may be erected. Further, the structural iron used in the upright posts and braces may be of any form—tubular or angles—most suited to the purpose, and no attempt is intended in the drawings to regulate this feature.

It will be readily understood that the swings at each corner of the tower may be sets of four or more revolving upon each shaft.

It is obvious that the entire tower would be under the control of a competent engineer stationed below.

What I claim is—

1. A rotating tower having a plurality of sides, provided with inclined guideways, elevating-carriages mounted to travel up and down in said guideways while the tower is rotating, and a circular track upon which the tower rotates as described.

2. A tower having a plurality of sides, a circular track upon which the tower rotates, horizontal shafts projecting from the extreme corners of said tower and swings revolving upon the shafts, said shafts diverging from a central vertical driving-shaft within the tower, as set forth.

3. The combination of a rotating tower, elevating-carriages arranged to travel up and down in guideways in the sides of the tower, revolving swings projecting from the extreme corners of the tower, and horizontal shafts diverging from a central vertical driving-shaft within the tower and upon which the swings revolve as described.

4. A tower, a circular track upon which the tower rotates, elevating-carriages arranged to travel up and down the sides of the tower, revolving swings projecting from each of the extreme corners of the tower, and a shelter-top and lookout-house upon the summit of the tower, said lookout-house rotating with the tower, as shown and described.

5. In combination with a rotating tower, a central vertical driving-shaft extending from the base to the top of the tower, a shifting gear-wheel upon the lower end of said shaft beneath the floor of the tower, a horizontal power-shaft beneath the floor of the tower and provided with a pinion with which said gear-wheel is adapted to be thrown in and out of mesh, means for shifting said gear-wheel, and a cog-wheel bolted to the tower beneath the base, said cog-wheel meshing with the said pinion upon the power-shaft, as shown and described.

6. A rotating tower having a vertical central driving-shaft extending from the base to the top of the tower, a pinion on said shaft at an intermediate point between the base and top of the tower, a plurality of gear-wheels meshing with said pinion, horizontal shafts diverging from the center of the tower and carrying said gear-wheels, and revolving swings carried directly by said shafts, as shown and described.

7. A rotating tower, having a vertical central driving-shaft extending from the base to the top of the tower, a pinion at the upper end of said shaft, a plurality of cog-gears with which said pinion meshes, a plurality of horizontal shafts disposed at right angles to each other, and carrying said cog-gears, sprocket-wheels mounted on the shafts at the outer ends thereof, endless sprocket-chains carried by said sprocket-wheels, sprocket-wheels at the base of the tower around which said sprocket-chains pass, said sprocket-wheels being each mounted upon a tension-block and elevating-carriages adapted to move up and down in guideways on the tower and connected with the said sprocket-chains, as described.

8. A rotating tower having inclined guideways, a plurality of elevating-carriages each adapted to be moved up and down one of said inclined guideways, an endless sprocket-chain for moving each carriage, a connecting-arm, a wrist-pin secured to the sprocket-chain and having a swivel connection with the upper end of the connecting-arm, and a supporting-yoke having a shaft to which the lower end of the connecting-arm is pivotally joined, the said yoke terminating at its forked ends in pivotal bearings beneath the carriage-seat, substantially as shown and described.

9. A rotating tower having inclined guideways, a plurality of elevating-carriages, each carried up and down one of said guideways, an endless sprocket-chain carrying each of said carriages, a connecting-arm, a wrist-pin connecting the upper end of said arm to the sprocket-chain, a yoke having a shaft end pivotally connected to said connecting-arm, said yoke being provided with forked ends having pivotal bearing beneath the carriage-seat, a spring having its free end situated above and engaging the shaft end of said yoke, a crank-lever pivotally attached to the side of said yoke, a clutch-shaft with the end of which the said lever is rigidly connected, and an eccentrically-disposed tooth-clutch attached to the outer end of said shaft, the said clutch being adapted to engage with the wooden track of the guideway, should the sprocket-chain break, as set forth.

10. A rotating tower, a circular track upon which said tower rotates, a central vertical driving-shaft for said tower, a sleeve passing through the floor and base of the tower for receiving the lower part of said vertical shaft and forming a long bearing for the same, and a foot-bearing for receiving the lower end of the vertical shaft, as shown and described.

11. A rotating tower having inclined sides provided with guideways, and a plurality of elevating-carriages adapted to travel up and down said inclined sides in said guideways, the said elevating-carriages in their transit, while the tower is rotating, describing a vertical cone-shaped spiral, and revolving swings diverging from the corners of the tower, the said swings while revolving describing a horizontal circular spiral when the tower is rotating, as described.

12. A pleasure-tower, flanged wheels carried at the base of the tower, a circular track upon which the wheels run and keepers at the base of the tower and extending beneath the wheels and the flanges of the track, the said tower being provided on its sides with elevating-carriages, and adapted to rotate upon the said circular track while the elevating-carriages are traveling up and down, or to remain at rest while the elevating-carriages are in motion, as set forth.

13. A pleasure-tower, a circular track upon which the tower is adapted to rotate, the said tower being adapted to remain stationary at the will of the operator, a plurality of elevating-carriages upon the sides of the tower, and revolving swings diverging from the corners of the tower, said elevating-carriages and revolving swings being adapted to remain at rest or to be in motion while the tower revolves, or while the tower is stationary, as described.

14. A rotating tower having a vertical central driving-shaft extending from the base to the top of the tower, a pinion at the upper end of the shaft, a plurality of horizontal shafts disposed at right angles to each other and provided with gear-wheels meshing with said pinion, a plurality of elevating-carriages arranged to travel up and down the sides of said tower, means actuated from the said horizontal shafts for moving said carriages, a pinion on said vertical driving-shaft at a point between the base and top of the tower, horizontal shafts driven from said pinion and revolving swings carried by said shafts, as set forth.

15. A rotating tower having a central vertical driving-shaft, extending from the base to the top of the tower, pinions on said shaft, elevating-carriages mounted to travel up and down in guideways in the sides of the tower, revolving swings projecting from the tower, and means for actuating the said carriages and swings from the said pinions on the vertical driving-shaft, as set forth.

16. A rotating tower having a plurality of sides, provided with guideways, elevating-carriages mounted to travel up and down in said guideways while the tower is rotating, and a circular track upon which the tower rotates, as described.

17. A rotating tower provided with upright guideways on its exterior, an elevating-carriage mounted to travel up and down said guideways, and means for simultaneously rotating the tower and moving said carriage up and down.

18. In combination, a tower provided with guideways, carriages adapted to move up and down thereon, mechanism for simultaneously rotating the tower and operating the carriages, and means whereby the tower may be permitted to rest while the carriages continue to move, or vice versa.

19. In combination, a tower provided with guideways, carriages adapted to move up and down thereon, mechanism whereby the tower is rotated simultaneously with the vertical movement of the carriages, and means whereby the carriages may be held at rest while the tower continues to rotate.

20. In combination, a rotary platform or table carrying a tower structure, observation-cars adapted to move up and down on the tower structure, mechanism for simultaneously rotating the tower and its platform and vertically moving the carriages, and safety dash-pot devices carried by the rotary table so as to rotate therewith.

21. In combination, a rotary table or platform carrying a tower structure, carriages adapted to move up and down thereon, means for simultaneously rotating the platform and operating the carriages, and safety devices for each carriage consisting of a socket secured in said table below each carriage, an extension-tube removably secured in said socket, and a piston carried by each carriage and adapted to enter said extension-tube, for the purpose set forth.

22. An amusement apparatus comprising a rotary tower, an observation-car in the nature of an elevator, and means for moving said car up and down the tower, substantially as described.

23. The combination with a rotating tower, guideways secured upon the exterior of the tower, and observation-cars mounted to travel up and down the exterior of the tower upon said guideways, substantially as described.

24. The combination with a continuously-rotating tower, having elevator-cars, of a rotating platform from which the cars may be loaded and unloaded without stopping the tower, substantially as described.

25. The combination with a rotating platform, of a tower having an elevator-car and mounted upon the platform to rotate therewith, the elevator-car having a landing upon the platform at which the passengers may enter and leave the car without interfering with the rotary movement, substantially as described.

26. The combination with a rotating platform and a tower mounted upon the platform to rotate therewith, of elevator-cars mounted to travel up and down the tower and arranged to land upon the platform, substantially as described.

27. The combination with a rotating tower, of an elevator-car, means on the tower for raising and lowering the elevator-car, and a rotating platform from which the car may be loaded and unloaded without stopping the tower, substantially as described.

In testimony whereof I hereunto set my hand this 13th day of January, 1905.

WM. R. SNYDER.

Witnesses:

CHARLES D. DAVIS,
UTLEY E. CRANE, Jr.